United States Patent [19]
You

[11] Patent Number: 5,347,640
[45] Date of Patent: Sep. 13, 1994

[54] CIRCUIT FOR GENERATING ADDRESSES FOR BUFFERING AND READING THE DATA FROM A CD-ROM AND METHOD THEREFOR

[75] Inventor: Ho-Joong You, Suwon, Rep. of Korea

[73] Assignee: SamSung Electronics Co., Ltd., Kyungki, Rep. of Korea

[21] Appl. No.: 732,144

[22] Filed: Jul. 18, 1991

[30] Foreign Application Priority Data

Aug. 9, 1990 [KR] Rep. of Korea ............... 1990-12213

[51] Int. Cl.⁵ .............................................. G06F 12/00
[52] U.S. Cl. ..................................... 395/400; 395/425; 364/DIG. 1; 364/251.3; 364/255.8
[58] Field of Search .............................. 395/400, 425; 364/200 MS File, 900 MS File

[56] References Cited

U.S. PATENT DOCUMENTS

| | | | |
|---|---|---|---|
| 4,429,386 | 1/1984 | Graden | 370/100 |
| 4,745,576 | 5/1988 | Hasegawa et al. | 395/400 |
| 4,814,873 | 3/1989 | Maekawa | 358/140 |
| 4,884,220 | 11/1989 | Dawson et al. | 395/125 |
| 4,901,318 | 2/1990 | Tomisawa | 371/40.1 |
| 5,045,951 | 9/1991 | Kimura et al. | 358/445 |
| 5,185,740 | 2/1993 | Kurose et al. | 370/106 |

*Primary Examiner*—Joseph L. Dixon
*Assistant Examiner*—Frank J. Asta
*Attorney, Agent, or Firm*—Robert E. Bushnell

[57] ABSTRACT

There is disclosed a circuit for improving the efficiency of processing the data of a CD-ROM by partitioning the buffer memory storing the data of the CD-ROM into a number of blocks, which in turn are divided two-dimensionally into X-address axis and Y-address axis so as to specify the blocks by the X- and Y-addresses.

19 Claims, 10 Drawing Sheets

| X\Y | 0 | 1 | 2 | 3 | 4 | ... | 22 | 23 | 24 | 25 |
|---|---|---|---|---|---|---|---|---|---|---|
| 0 | 0000 | 0043 | 0086 | 0129 | 0172 | | 0745 | 0989 | 1032 | 1075 |
| 1 | 0001 | 0044 | 0087 | 0130 | 0173 | | 0947 | 0990 | 1033 | 1076 |
| 2 | 0002 | 0045 | 0086 | 0131 | | | 0948 | 0991 | 1034 | 1077 |
| 3 | 0003 | 0046 | | | | | 0949 | 0992 | 1035 | 1078 |
| 4 | 0004 | 0047 | | | | | | | | |
| ... | | | | | | | | | | |
| 41 | 0041 | 0084 | | | | | 0987 | 1030 | 1073 | 1116 |
| 42 | 0042 | 0085 | | | | | 0988 | 1031 | 1074 | 1117 |
| 43 | 1127 | 1128 | | | | | | 1124 | 1125 | 1126 |
| 44 | 1152 | 1153 | | | | | | | 1150 | 1151 |

P—SEQUENCE

Q—SEQUENCE

P—PARITY

Q—PARITY

*FIG. 6*

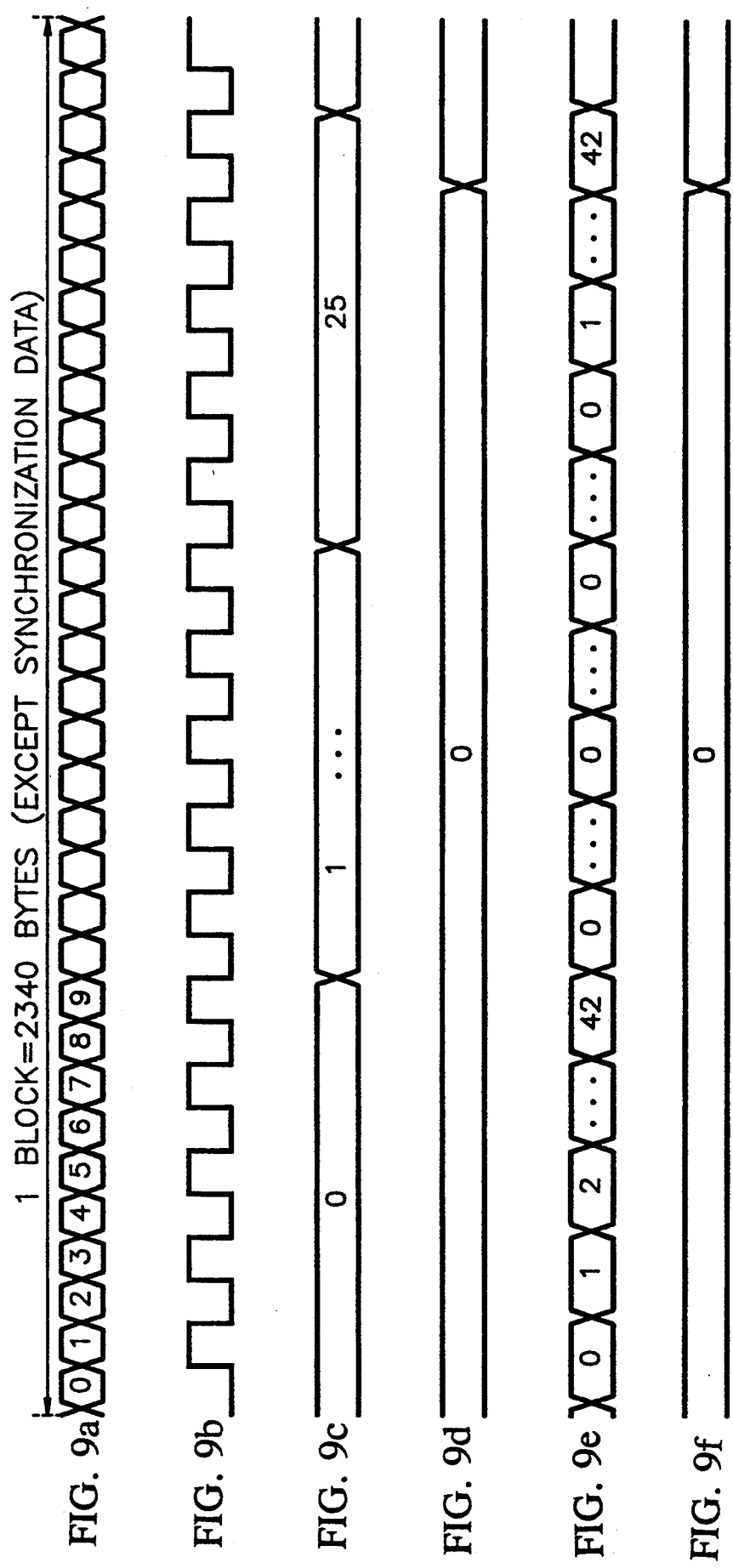

FIG. 10a
FIG. 10b
FIG. 10c
FIG. 10d
FIG. 10e
FIG. 10f
FIG. 10g
FIG. 10h

CIRCUIT FOR GENERATING ADDRESSES FOR BUFFERING AND READING THE DATA FROM A CD-ROM AND METHOD THEREFOR

BACKGROUND OF THE INVENTION

The present invention relates to a circuit for generating addresses for accessing error detection and correction data from a buffer memory in a CD-ROM or CD-Interactive (CD-i) system, and method therefor.

The data for a CD-ROM or CD-i system consist of 2352 bytes including synchronization 12-bytes per one block. These data are divided into LSB bytes and MSB bytes immediately after synchronization, and undergo error detection and correction for each of two planes. In such a CD-ROM or CD-i system, the parity symbols (P-parity, Q-parity) for the error detection and correction are added to the data in order to improve the reliability of the data processing. The format of the parity is specified in the Yellow Book of the International Specification for the CD-ROM. The decoding of the parity symbols (P-parity, Q-parity) requires the generation of complicated address signals.

The generation of the address signals is accomplished by a method employing a software or hardware. The method employing a software needs long processing time, so that it is difficult to achieve the real time processing. Meanwhile, the method employing a hardware is achieved by the table lock-up system using a ROM into which the addresses are stored for reading as desired. This method, though providing high processing speed, needs a system construction of TTL level, so that the circuit construction is very complicated requiring a large area for integration.

SUMMARY OF THE INVENTION

The present invention intends to provide a circuit for improving the efficiency of processing the data of a CD-ROM and method therefor by partitioning the buffer memory storing the data of the CD-ROM into a number of blocks, which in turn are divided two-dimensionally into X-address axis and Y-address axis so as to specify the blocks by the X- and Y-addresses.

According to the present invention, a circuit for generating address signals for buffering the data of a CD-ROM comprises a first means for generating write address data in response to a write control signal and clock pulses received through a first input, a second means for generating read address data in response to a read control signal and clock pulses received through a second input, and a read/write mode selection means for selecting said write or read address data for said buffer memory in response to a read or write mode selection signal.

The present invention will now be described with reference to the drawings attached only by way of example,

BRIEF DESCRIPTION OF THE ATTACHED DRAWINGS

FIG. 6 illustrates the allocation of buffering data according to the present invention;

FIGS. 9a–9f illustrates timing diagrams of the data buffering according to the present invention; and FIGS. 10a–10b illustrates timing diagrams of reading P and Q code words according to the present invention.

DETAILED DESCRIPTION OF THE PREFERRED EMBODIMENT

Figure 1:
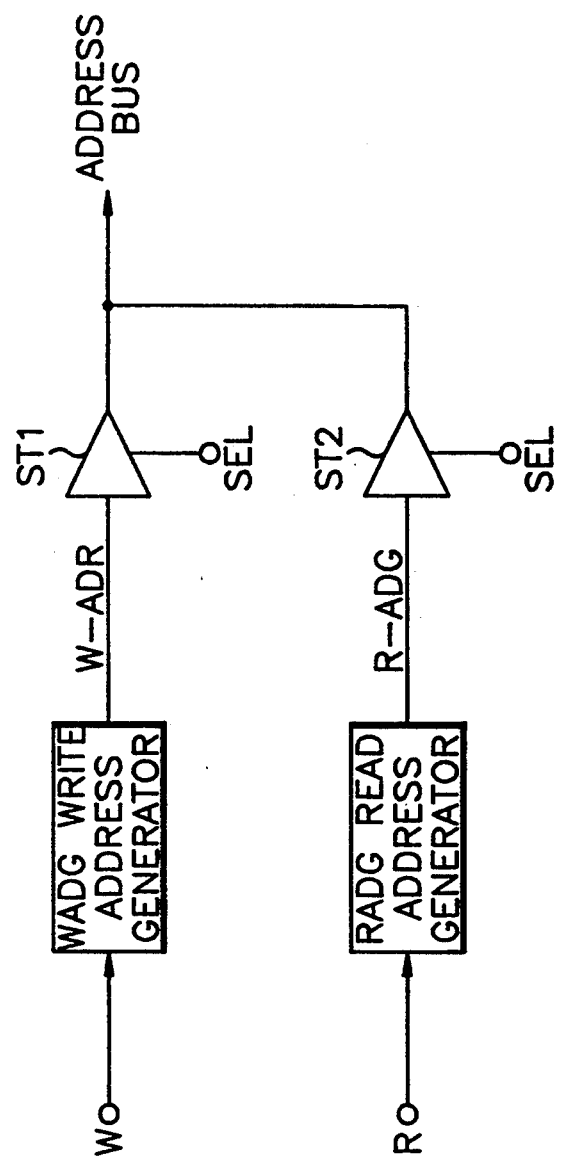
FIG. 1 is a block diagram for illustrating the inventive circuit.

Referring to FIG. 1, write address data generator (WADG) generates write address data in response to the control signal and clock pulses received through a first input (W). Read address data generator (RADG) generates read address data in response to the control signal and clock pulses received through second input (R).

Read/write mode selection means transfers the output signal of the write or read address data generator (WADG or RADG) to a buffer memory (not shown in the drawings) in response to a read or write mode selection signal received through selection terminal (SEL). The read/write mode selection means comprises three-state buffers ST1 and ST2.

Figure 2:
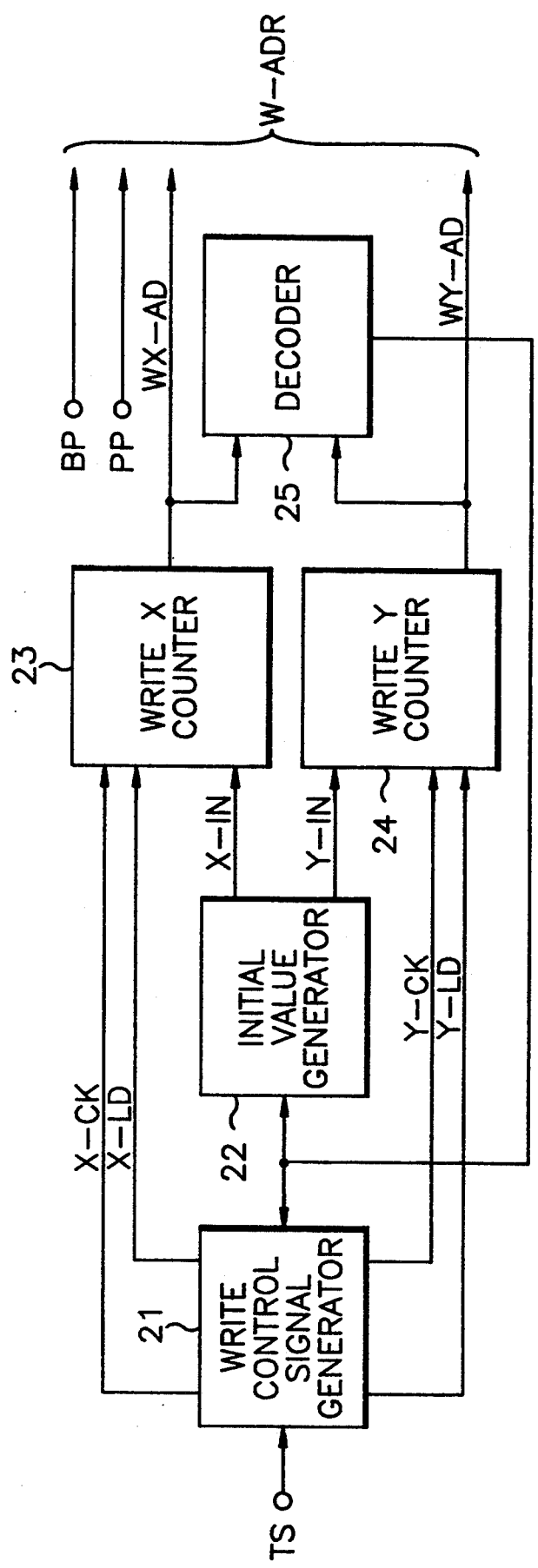
FIG. 2 is a block diagram for specifically illustrating the write address data generator (WADG) of FIG. 1.

Referring to FIG. 2, write control signal generator 21 generates X,Y clock pulses (X,Y-CK) and initial X,Y load signals (X,Y-LD) by processing command input data of time signal input (TS). Initial value generator 22 generates a signal for controlling the initialization of the write control signal generator 21 and write X,Y counters 23 and 24. The write X,Y counters 23, 24 are initialized by the output signal of the initial value generator 22, and are loaded with initial X,Y load signals X,Y-LD of the write control signal generator 21, generating the X,Y write address data by counting the X,Y clock pulses.

Decoder 25 decodes the X,Y write data from the write X,Y counters 23, 24 in order to generate a control signal for the write control signal generator 21 and initial value generator 22 to select the initial value and the clock signal. The output signals of the write X,Y counters 23, 24 and the signals of block point input (BP) and plane point input (PP) are applied as the write address data to the first three-state buffer ST1.

Figure 3:
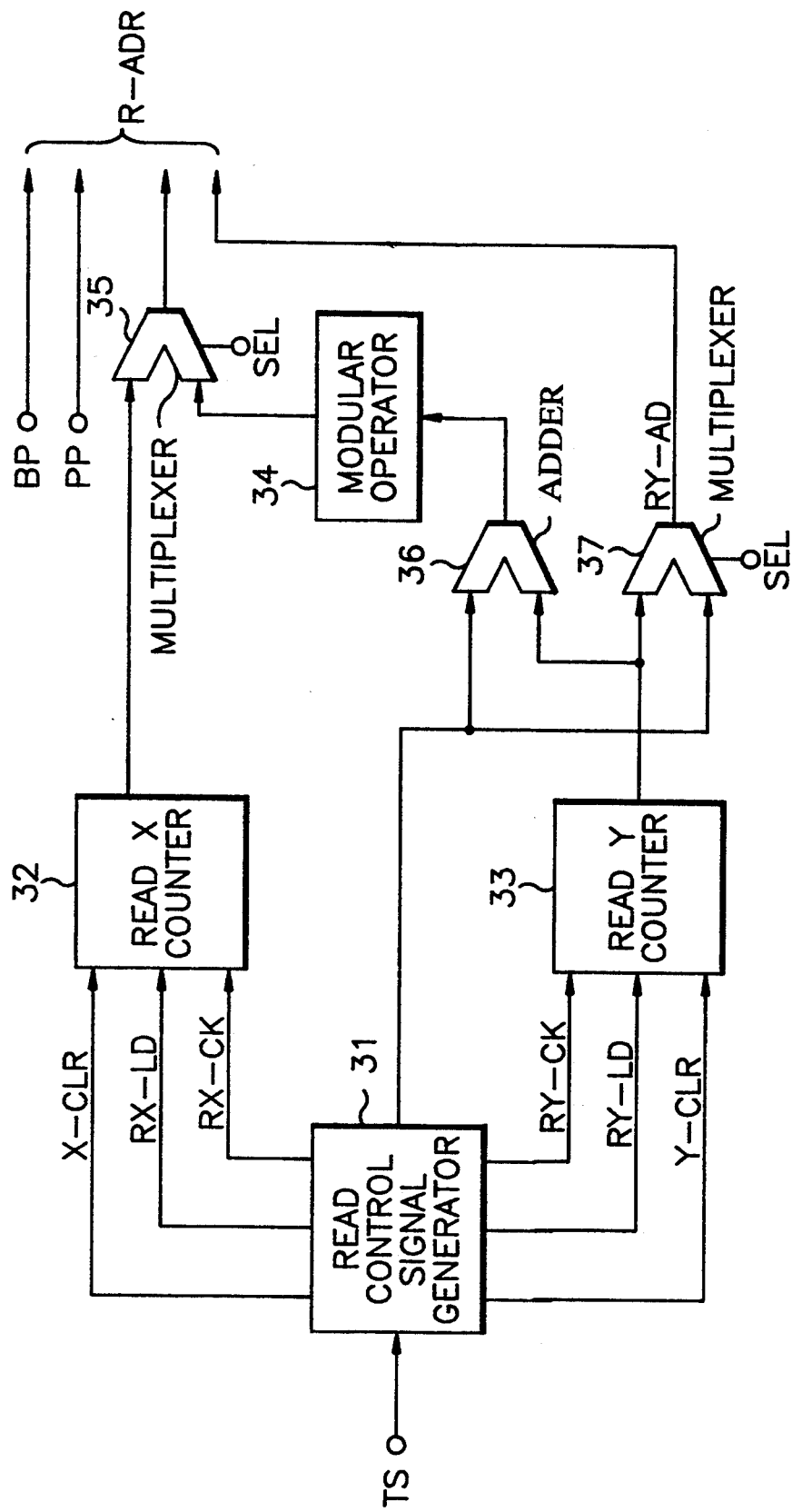
FIG. 3 is a block diagram for specifically illustrating the read address data generator (RADG) of FIG. 1.

Referring to FIG. 3, read control signal generator 31 processes the command data from time signal input (TS) so as to generate X,Y clear signals X,Y-CLR, X,Y load signals RX,RY-LD, and X,Y clock signals RX,RY-CK to initialize X,Y read counters 32, 33 for generating the X,Y address data.

Multiplexer 37 receives the output code word sequence number n of the read control signal generator 31 and the output of the Y read counter 33 in order to generate the Y address data according to a selection signal input through selection terminal SEL.

Adder 36 adds the output code word sequence number n of the read control signal generator 31 and the output of the Y read counter 33. Modular operator 34 provides a given modular value in response to the output of the adder 36. Multiplexer 35 selects the output of the X read counter 32 or the output of the modular operator 34 according to a selection signal input through selection terminal SEL.

The X,Y read address data produced by the multiplexers 35 and 37 and the signals of the block point input BP and the plane point input PP are applied to the second three-state buffer ST2.

Figure 4A:
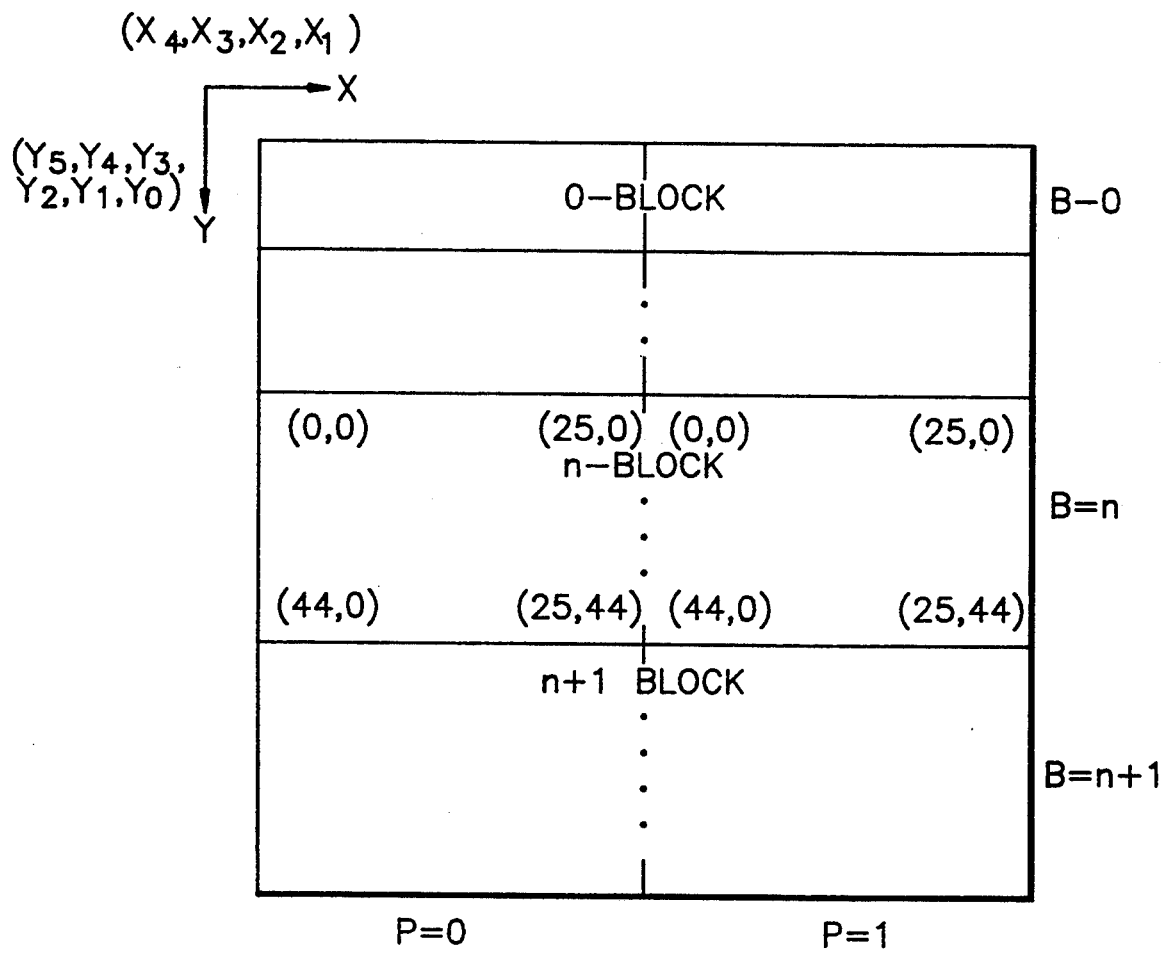
FIGS. 4a, 4b and 5 show a map representing the allocation of the addresses of a buffer memory according to the present invention.
Figure 4B:
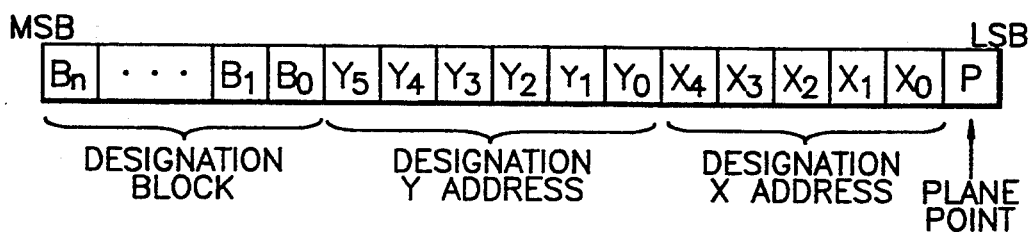
Figure 5:
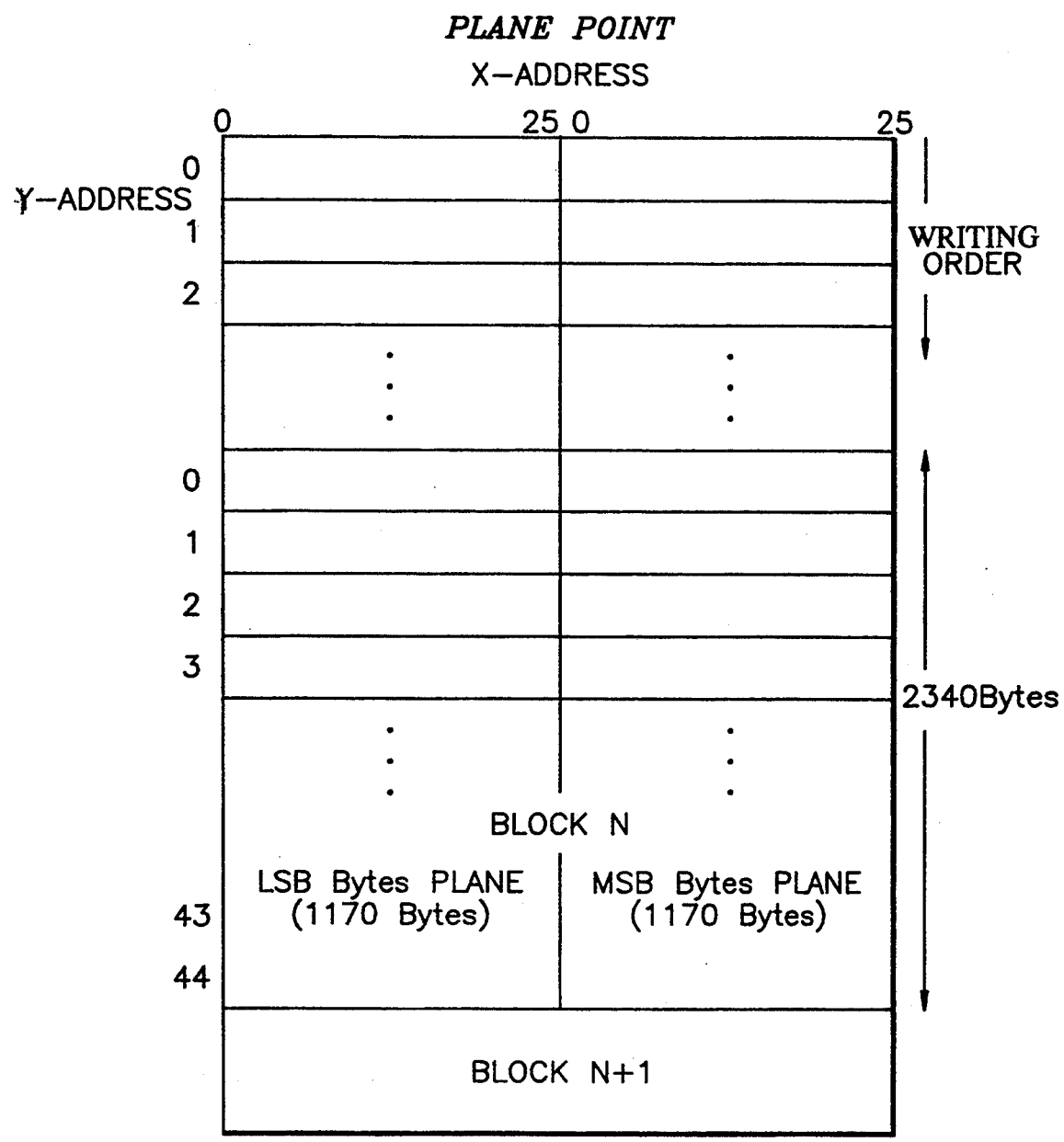

Referring to FIGS. 4 and 5 for illustrating the allocation of the addresses of the buffer memory, the X addresses consist of X0-X4, and the Y addresses Y0-Y5, so that the total eleven bits constitute one plane data to be accessed. Each plane in turn is divided by the plane point as one bit. Besides each plane is divided into blocks by B0-Bn, and the data symbols may be designated as FIG. 4b.

Figure 7:
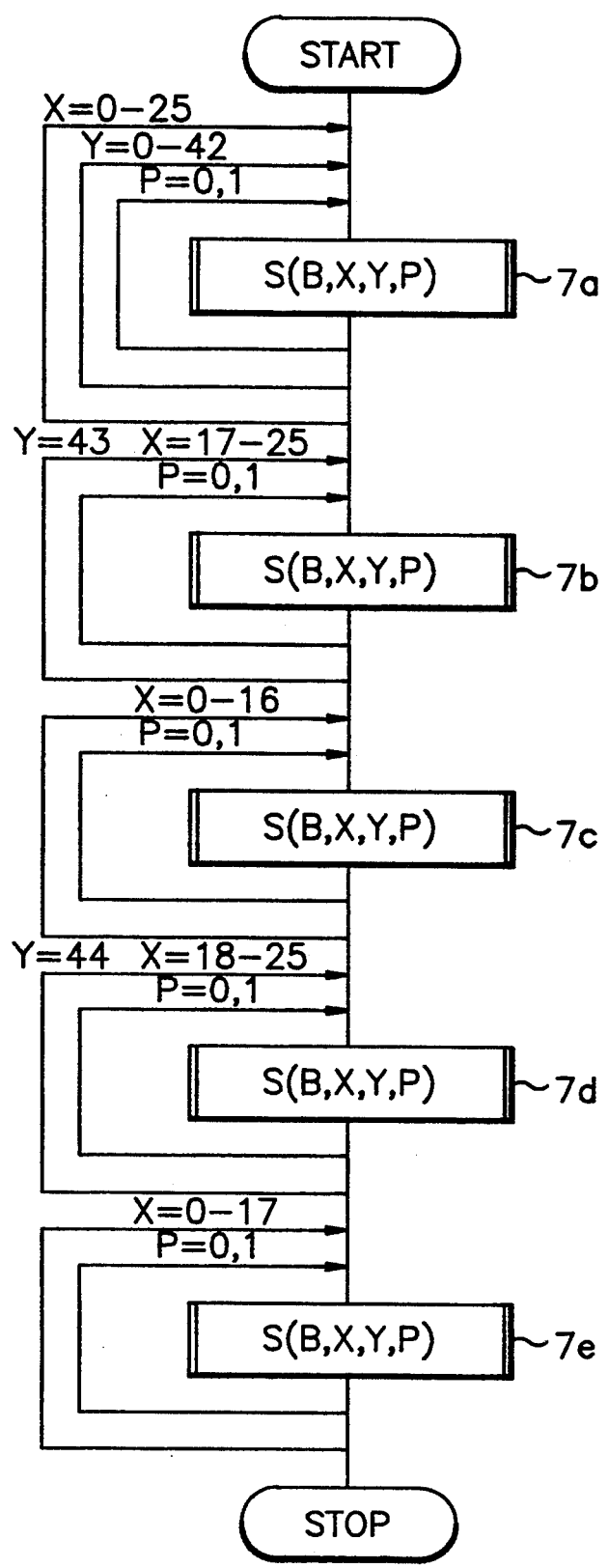
FIG. 7 is a flow chart of the data buffering according to the present invention.

Referring to FIG. 6, the P-parity is positioned in the 24th and 25th lines in the X-axis, and the Q-parity in the 43th and 44th lines in Y-axis. The reason is to advantageously generate the addresses when decoding for the positioning. Referring to FIG. 7, the data buffering comprises the steps of writing the data of a user and the P-parity, storing the data of the first Q-parity, and sequentially writing the second to fourth Q-parities.

Figure 8:
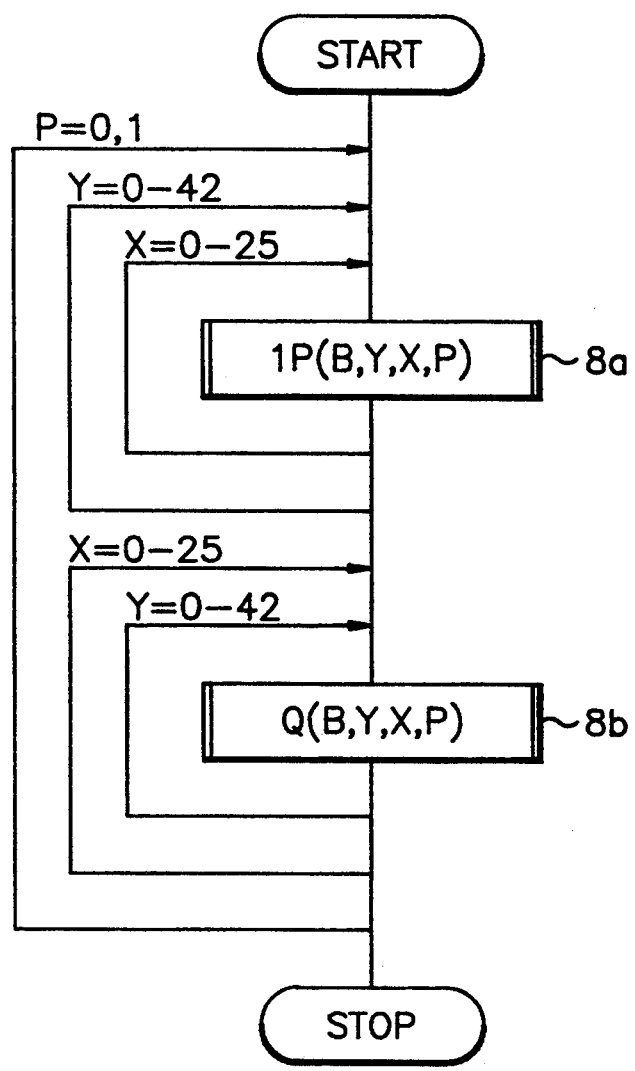
FIG. 8 is a flow chart of reading the code words according to the present invention.

Referring to FIG. 8, the reading of the code words comprises the steps of reading the P code data of a frame, and reading the Q code data of a frame.

FIG. 9a represents the waveform of the symbol data of a block (2340 bytes) except the synchronization data, FIG. 9b the waveform of the plane selection clock pulses, FIG. 9c the waveform of the write address data of X-axis, FIG. 9d the output waveform of the X-axis initial control terminal (X-in) of the X write counter 23 of the initial value generator 22 of FIG. 2, FIG. 9e the waveform of the Y-axis write address data, and FIG. 9f the output waveform of the Y-axis initial control terminal (Y-in) of the Y write counter 24 of the initial value generator 22 of FIG. 2.

FIGS. 10a to 10d represent the timing diagram of the P code, and FIG. 10e to 10h the timing diagram of Q code. More specifically, FIG. 10a is the timing diagram of the code words, FIG. 10b the timing diagram of the symbol data, FIG. 10c the timing diagram of X-axis read address data, FIG. 10d the timing diagram of the Y-axis read address data, FIG. 10e the timing diagram of the code words, FIG. 10f the waveform of the symbol data, FIG. 10g the timing diagram of the X-axis read address data, and FIG. 10h the timing diagram of the Y-axis read address data.

Referring to FIG. 1, receiving the data for commanding the reading and writing the buffer respectively through the first and second input W and R, the read and write address data generators WADG and RADG respectively generate the read address data for reading the P and Q codes of the X-axis and Y-axis, and the write address data for storing the P and Q codes of the X-axis and Y-axis. The buffer memory (not shown) is accessed by the read and write address data.

Referring to FIG. 2, the write control signal generator 21 generates the clock signals X-CK and Y-CK and initialization loading signals X-LD and Y-LD to load the write X and Y counters 23 and 24 in response to the command data from the time signal input TS. The initial value generator 22 generates the initial values for the write X and Y counters 23 and 24. The write X and Y counters 23 and 24 are respectively a five-bit counter for generating the X address data and a six-bit counter for generating the Y address data. The decoder 25 decodes the output signals of the write X and Y counters 23 and 24, so that the write X and Y counters 23 and 24 may select required initial value and clock signal.

When the timing signal of the external command from the time signal input requires the data buffering in the write mode, symbols are written into the buffer memory to 1117th position of FIG. 6 for each plane according to the values generated by the write X and Y counters 23 and 24 immediately after synchronization. Namely the write control signal generator 21 generates X,Y-CK and X,Y-LD used for the drive clock signals of the write X,Y counters 23 and 24, when Y-CK is generated in the period to have two symbols, and X-CK is generated in the period for the Y-axis write address data to become 0-42, thus writing the header, user's data and P-parity.

However, a different method is used for the Q-parity region, i.e. from 1118th symbol to 1169 symbol of each plane. When the symbol data is written to the P-parity, the addresses of X and Y come to have 25 and 42 as shown in FIG. 6. The X and Y addresses 25 and 42 are detected by the decoder 25 input into the initial value generator 22 to generate the initial value. In this case, the X initial value X-in and Y initial value Y-in are made to have respectively 17 and 43, respectively applied to the write X counter 23 and write Y counter 24. The X clock signal is made to have the period of two symbol data, and Y-CK is made to be in the static state, so that the data writing continues until the X and Y addresses come to have respectively 25 and 43. Thereafter, the X initial value X-in and Y initial value Y-in come to have respectively 0 and 43, and the data storing continues. Then if the X and Y addresses come to have 16 and 43, this indicates that the data storing is accomplished to 43th Y-axis Q-parity. From this time, the X clock terminal is driven with the X initial value X-in of 18 and Y initial value Y-in of 44, and the data storing continues until the addresses X and Y come to have respectively 25 and 44. Thereafter, the X initial value X-in and Y initial value Y-in are made to have respectively 0 and 44, and the data storing continues until the X and Y addresses come to have respectively 17 and 44, when the buffering for a block is completed as shown in FIG. 4. As a result, there is obtained the data array stored as shown in FIG. 6.

Referring to FIG. 7, B represents block, X and Y the designated address values of the X and Y axes, and P the plane designation. The designations of the blocks B and planes P are accomplished by the values from the block point input BP and plane point input PP of FIG. 2. The values of the X and Y axes are determined by the counting of the X and Y write counters 23 and 24, the output data of which respectively have two bits so as to produce the total four bits applied to the buffer memory as the address signal.

Namely, in step 7a, the X write counter 23 counts 00-25, the Y write counter 24 counts 00-42, and the plane point input PP is applied alternately with 0 and 1. The block point input BP is designated to the first block, so that the write X and Y counters 23 and 24 generate the output signals as shown in FIGS. 9c and 9e. The decoder 25 decodes the output values of the write X and Y counters 23 and 24, until the values respectively reach 25 and 42. Namely, the write X and Y counters 23 and 24 count to the address of 1117 of FIG. 6 so as to write the data of the user and P-parity. If the decoder 25 decodes 1117, i.e. X=25 and Y=42, the output signal of the decoder is applied to the write control signal generator 21 and the initial value generator 22 as the control signal, so as to make the X initial value X-in and Y initial value Y-in respectively have 17 and 43. Thereafter, in step 7b, the X and Y write counters 23 and 24 continue to count so as to designate the addresses of the Q-parity region of FIG. 6. Then if the output values of the X and Y counters 23 and 24 come to have respectively 25 and 43 (1126), the output signal of the decoder 25 is applied to the write control signal generator 21 and initial value generator 22, thus making the X initial value X-in and Y initial value Y-in respectively have "0" and "43". In step 7c, when the output values of the write X and Y counters 23 and 24 come to have respectively 16 and 43, the output signal of the decoder 25 controls the initial value generator 22, thus making the X initial value X-in and Y initial value Y-in have 18 and 44. In step 7d, the write X and Y counters 23 and 24 continue to count respectively to 25 and 44, when the output signal of the decoder 25 controls the initial value generator 22 so as to make the X initial value X-in and Y initial value Y-in have "0" and "44". Likewise, in step 7e, if the write X and Y counters 23 and 24 respectively count X=17 and Y=44, the buffering of one block is completed.

Hereinafter, the reading of the P code words is described with reference to FIG. 6. the P code words are arranged in parallel with the X-axis, so that the "n"th code word is designated directly by the Y-axis address, and the symbol position of each code word is specified by the X-axis address. Referring to FIG. 3, the read control signal generator 31 generates for the X and Y read counters the read X and Y clock signals RX-CK and RY-CK, load X and Y signals RX-LD and RY-LD, and clear X and Y signals X-CLR and Y-CLR, and signals for designation of "n"the code word and "k"th symbol. The multiplexer 35 selects the output value of the X read counter 32 or the output value of the modular operator 34 according to P,Q-code words, thus generating X read address data that is X-axis address. The multiplexer 37 selects the output value of the Y read counter 33 or the n value of the code word sequence, thus generating Y read address data that is Y-axis address value. The adder 36 that is a six bit adder for adding the output of the Y read counter 33 and "n" is to generate the X read address data designated by the modular operator 34 in order to designate the symbol of Q-code word. The modular operator 34 takes the output of the adder 36 as a module applied to the multiplexer 35 to generate the X read address data.

Meanwhile, when reading the P code words, the Y read counter 33 does not work, and the multiplexer 37 selects the sequence "n" of the P code word from the read control signal generator 31 in response to the selection signal SEL, thus maintaining the Y read address data in the state of "n".

The read X clock signal RX-CK generated by the read control signal generator 31 is counted by the X read counter 32, the output of which is applied to the multiplexer 35 to generate the X read address data of the X-axis address according to the selection signal SEL. As a result, the read address data consists of the X and Y address data, block point B and plane point P.

In order to read the Q code word, the Q code word read command is applied to the read control signal generator 31 to work in the period of every code byte, and the Y read clock signal RY-CK is counted by the Y read counter 33. In this case, the Y read counter 33 increases the output value applied to the multiplexer 37 by one per every code byte from 0 to the cord word interval 44. The increased output value is selected according to the selection signal SEL to produce the Y read address. The X read counter 32 does not work during reading the Q code word, and the output value "n" designated as the "n"th code word of the read control signal generator 31 and the output value of the Y read counter 33 are added by the adder 36 to produce n+k that provides the final address value through the modular operator 34. The output value of the modular operator 34 is selected by the multiplexer 35 according to the selection signal SEL, thus producing the X read address data of the X-axis address.

The write address data generated by the write address data generator WADG and the read address data of the code words generated by the read address data generator RADG are selected respectively by the three-state buffers ST1 and ST2 according to the selection signals SEL, thus input through address bus to the buffer memory.

As stated above, there are provided a circuit for generating a desired address without using an ROM during decoding and method therefor, and the data buffering may be more effectively achieved.

What is claimed is:

1. A circuit for generating address data for accessing a buffer memory for writing and reading parity data, said circuit comprising:

a write address generator for generator write address data in response to a received write control signal and received clock pulses, said write address generator comprising:

an initial value generator for generating a first initial value, a second initial value and an initialization control signal, a write control signal generator for generating first clock pulses, second clock pulses, a first load signal and a second load signal in response to said initialization control signal, a first write counter having a first clock input for receiving said first clock pulses, a first load input for receiving said first load signal, and an initialization input for receiving said first initial value, said first write counter being initialized for generating first write address data by counting said first clock pulses up from said first initial value in response to said first load signal, a second write counter having a second clock input for receiving said second clock pulses, a second load input for receiving said second load signal, and an initialization input for receiving said second initial value, said second write counter being initialized for generating second write address data by counting said second clock pulses up from said second initial value in response to said second load signal, and address decoder means for generating a signal for controlling said initial value generator by receiving and decoding said first and second write address data;

a read address generator for generating read address data in response to said a read control signal and said received clock pulses; and read/write mode selection means for receiving said first and second write address data, as said write address data generated by said write address generator, for receiving said read address data generated by said read address generator and for selecting one of said write address data and said read address data for output to said buffer memory in response to one of a write mode selection signal and a read mode selection signal.

2. The circuit as claimed in claim 1, said read address generator comprising;
   a read control signal generator for generating an output code word sequence number, a first clear signal, a second clear signal, first read clock pulses, second read clock pulses, a first read load signal and a second read load signal;
   a first read counter for generating first read address data by counting said first read clock pulses in response to one of said first clear signal and said first read load signal;
   a second read counter for generating second read address data by counting said second read clock pulses in response to one of said second clear signal and said second read load signal;
   an adder for generating summation address data by adding said output code word sequence number and said second read address data;
   modular operator means for generating a modular address value in response to said summation address data; and
   selection means for outputting, as said read address data, one of a first output comprised of said first and second read address data and a second output comprised of said modular address value and said output code word sequence number.

3. The circuit as claimed in claim 1, further comprised of said read/write selection means comprising:
   a first three-state buffer for outputting said write address data to said buffer memory in response to said write mode selection signal; and
   a second three-state buffer for outputting said read address data to said buffer memory in response to said read mode selection signal.

4. A circuit for generating address data for accessing a buffer memory for writing and reading parity data, said circuit comprising:
   a write address generator for generating write address data in response to a received write control signal and received clock pulses;
   a read address generator for generating read address data in response to said a read control signal and said received clock pulses, said read address generator comprising:
   a read control signal generator for generating an output code word sequence number, a first clear signal, a second clear signal, first read clock pulses, second read clock pulses, a first read load signal and a second read load signal,
   a first read counter for generating first read address data by counting said first read clock pulses in response to one of said first clear signal and said first read load signal,
   a second read counter for generating second read address data by counting said second read clock pulses in response to one of said second clear signal and said second read load signal,
   an adder for generating summation address data by adding said output code word sequence number and said second read address data,
   modular operator means for generating a modular address value in response to said summation address data, and
   selection means for outputting, as said read address data, said first and second read address data or said modular address value and said output code word sequence number; and
   read/write mode selection means for receiving said write address data generated by said write address generator and said read address data generated by said read address generator and for selecting one of said write address data and said read address data for output to said buffer memory in response to one of a write mode selection signal and a read mode selection signal.

5. The circuit as claimed in claim 4, said write address generator comprising:
   an initial value generator for generating a first initial value, a second initial value and an initialization control signal;
   a write control signal generator for generating first clock pulses, second clock pulses, a first load signal and a second load signal in response to said initialization control signal;
   a first write counter having a first clock input for receiving said first clock pulses, a first load input for receiving said first load signal, and an initialization input for receiving said first initial value, said first write counter for generating first write address data by being initialized for counting said first clock pulses up from said first initial value in response to said first load signal;
   a second write counter having a second clock input for receiving said second clock pulses, a second load input for receiving said second load signal, and an initialization input for receiving said second initial value, said second write counter for generating second write address data by being initialized for counting said second clock pulses up from said second initial value in response to said second load signal; and
   address decoder means for controlling said initial value generator by receiving and decoding said first and second write address data for generating a signal.

6. The circuit as claimed in claim 4, said read/write selection means comprising:
   a first three-state buffer for outputting said write address data to said buffer memory in response to said write mode selection signal; and
   a second three-state buffer for outputting said read address data to said buffer memory in response to said read mode selection signal.

7. A circuit for generating first and second write address data for accessing a buffer memory of a CD-ROM for writing P-parity data and Q-parity data, said circuit comprising:
   an initial value generator for generating a first initial value, a second initial value and an initialization control signal;
   a write control signal generator for receiving a timing signal comprised of command data, for processing said command data for generating first clock pulses, second clock pulses, a first load signal and a second load signal in response to said initialization control signal;
   a first write counter having a first clock input for receiving said first clock pulses, a first load input for receiving said first load signal, and an initialization input for receiving said first initial value, said first write counter for generating said first write address data by being initialized for counting said first clock pulses up from said first initial value in response to said first load signal;

a second write counter having a second clock input for receiving said second clock pulses, a second load input for receiving said second load signal, and an initialization input for receiving said second initial value, said second write counter for generating said second write address data by being initialized for counting said second clock pulses up from said second initial value in response to said second load signal; and address decoder means for generating a signal for controlling said initial value generator by receiving and decoding said first and second write address data.

8. The circuit as claimed in claim 7, further comprised of a tri-state buffer responsive to a write mode signal for receiving and supplying said write address data to said buffer memory.

9. A circuit for generating address data for accessing a buffer memory of a CD-ROM for reading P-parity data and Q-parity data, said circuit comprising:

a read control signal generator for receiving a timing signal comprised of command data, for processing said command data for generating a code word sequence number, a first clear signal, a second clear signal, first read clock pulses, second read clock pulses, a first read load signal and a second read load signal;

a first read counter for generating first read address data by counting said first read clock pulses in response to one of said first clear signal and said first read load signal;

a second read counter for generating second read address data by counting said second read clock pulses in response to one of said second clear signal and said second read load signal;

an adder for generating summation address data by adding said output code word sequence number and said second read address data;

modular operator means for generating a modular address value in response to said summation address data; and selection means for outputting, as said address data for accessing said buffer memory, said first and second read address data or said modular address value and said output code word sequence number.

10. The circuit as claimed in claim 9, further comprised of a tri-state buffer responsive to a read mode signal for receiving and supplying said address data to said buffer memory.

11. A method for accessing a buffer memory of a CD-ROM said method comprising the steps of:

generating first and second write address data for writing P-parity data and Q-parity data to said buffer memory, said generating step comprising the steps of;

generating first and second initial values and an initializing signal in response to a initializing control signal, processing write command data of a timing signal for generating first and second clock pulses, and for generating first and second load signals in response to said initializing signal, loading said first initial value into a first counter in response to said first load signal and counting said first clock pulses up to a first count from said initial value, said first count forming said first write address data, loading said second initial value into a second counter in response to said second load signal and counting said second clock pulses up to a second count from said initial value, said second count forming said second write address data, and decoding said first and second counts for generating said initializing control signal.

12. The method as claimed in claim 11 further comprising the step of:

supplying block point data, plane point data, said first write address data and said second write address data to a tri-state buffer for output to said buffer memory as a write address signal for writing one of said P and Q parity data to said buffer memory in response to a write mode selection signal.

13. The method as claimed in claim 11, further comprising the steps of:

generating read address signals for reading P-parity data and Q-parity data from said buffer memory, said read address signal generating step comprising the steps of;

processing read command data of said timing signal for generating a code word sequence number, for generating first and second read clock pulses, for generating first and second read load signal and for generating first and second clear signals, supplying said first clear signals, said first read load signals and said first read clock pulses to a first read counter, supplying said second clear signals, said second read load signals and said second read clock pulses to a second read counter, counting said first read clock pulses to generate first read address data, counting said second read clock pulses to generate second read address data, and outputting said first and second read address data in response to a selection signal.

14. The method as claimed in claim 13, further comprising the step of:

supplying block point data, plane point data, said first read address data and said second read address data to a tri-state buffer for output to said buffer memory as a read address signal for reading one of said P and Q parity data from said buffer memory in response to a read mode selection signal.

15. A method for accessing a buffer memory of a CD-ROM said method comprising the steps of:

generating read address signals for reading P-parity data and Q-parity data from said buffer memory, said read address signal generating step comprising the steps of;

processing read command data of a timing signal for generating a code word sequence number, for generating first and second clock pulses, for generating first and second load signals and for generating first and second clear signals, supplying said first clear signals, said first load signals and said first clock pulses to a first counter, supplying said second clear signals, said second load signals and said second clock pulses to a second counter, counting said first clock pulses to generate first read address data, counting said second block pulses to generate second read address data, adding said code word sequence number and said second read address data for generating summation data, applying a modular value to said summation data for generating third read address data, supplying said first and third read address data to a first selection means, supplying said code word sequence number and said second read address data to a second selection means, and controlling said first and second selection means for selectively outputting one of a first output comprised of said first and second read address data and a second output comprised of said third read address data and said code word sequence number, in response to a selection signal.

16. The method as claimed in claim 15, further comprising the step of:

supplying block point data, plane point data, said first read address data and said second read address data to a tri-state buffer for output to said buffer memory as a read address signal for reading one of said P and Q parity data from said buffer memory in response to a read mode selection signal.

17. The method as claimed in claim 15, further comprising the step of:

supplying block point data, plane point data, said code word sequence number and said third read address data to a tri-state buffer for output to said buffer memory as a read address signal for reading one of said P and Q parity data from said buffer memory in response to a read mode selection signal.

18. The method as claimed in claim 15, further comprising the steps of:

generating first and second write address data for writing P-parity data and Q-parity data to said buffer memory, said first and second write address data generating step comprising the steps of;

generating first and second initial values and an initializing signal in response to a initializing control signal, processing write command data of said timing signal for generating first and second write clock pulses, and for generating first and second write load signals in response to said initializing signal, loading said first initial value into a first write counter in response to said first write load signal and counting said first write clock pulses up to a first count from said initial value, said first count forming said first writing address data, loading said second initial value into a second write counter in response to said second write load signal and counting said second write clock pulses up to a second count from said initial value, said second count forming said second write address data, and decoding said first and second counts for generating said initializing control signal.

19. The method as claimed in claim 18, further comprising the steps of:

supplying block point data, plane point data, said first write address data and said second write address data to a tri-state buffer for output to said buffer memory as a write address signal for writing one of said P and Q parity data to said buffer memory in response to a write mode selection signal.

* * * * *

UNITED STATES PATENT AND TRADEMARK OFFICE
CERTIFICATE OF CORRECTION

PATENT NO. : 5,347,640
DATED : 13 September 1994
INVENTOR(S) : Ho- Joong You

It is certified that error appears in the above-indentified patent and that said Letters Patent is hereby corrected as shown below:

ON THE TITLE PAGE

Title, [54], Change Title to --CIRCUIT FOR GENERATING WRITE AND READ ADDRESSES FOR BUFFERING AND READING DATA FROM A BUFFER MEMORY OF A CD-ROM AND METHOD THEREFOR --;

Column 10, Line 27 after "load" change "signal" to --signals--:

Signed and Sealed this

Nineteenth Day of November, 1996

Attest:

BRUCE LEHMAN

*Attesting Officer*     *Commissioner of Patents and Trademarks*